(12) United States Patent
Sakai et al.

(10) Patent No.: US 12,065,087 B2
(45) Date of Patent: Aug. 20, 2024

(54) VEHICLE DEVICE

(71) Applicant: DENSO CORPORATION, Kariya (JP)

(72) Inventors: Hatsuho Sakai, Kariya (JP); Tetsuo Kurita, Kariya (JP)

(73) Assignee: DENSO CORPORATION, Kariya (JP)

( * ) Notice: Subject to any disclaimer, the term of this patent is extended or adjusted under 35 U.S.C. 154(b) by 363 days.

(21) Appl. No.: 17/530,722

(22) Filed: Nov. 19, 2021

(65) Prior Publication Data
US 2022/0073019 A1 Mar. 10, 2022

Related U.S. Application Data

(63) Continuation of application No. PCT/JP2020/018677, filed on May 8, 2020.

(30) Foreign Application Priority Data

May 23, 2019 (JP) ................ 2019-096783

(51) Int. Cl.
| | |
|---|---|
| B60R 16/02 | (2006.01) |
| B60K 35/00 | (2006.01) |
| B60R 16/023 | (2006.01) |
| B60R 16/033 | (2006.01) |
| G06F 11/20 | (2006.01) |
| B60K 35/23 | (2024.01) |
| B60K 35/28 | (2024.01) |
| G06F 11/07 | (2006.01) |

(52) U.S. Cl.
CPC .......... B60R 16/0232 (2013.01); B60K 35/00 (2013.01); B60R 16/033 (2013.01); G06F 11/20 (2013.01); B60K 35/23 (2024.01); B60K 35/28 (2024.01); B60K 2360/164 (2024.01); B60K 2360/167 (2024.01); B60K 2360/176 (2024.01)

(58) Field of Classification Search
CPC .......... G06F 11/30; G06F 11/07; G06F 11/14; G06F 9/48; B60R 16/02
See application file for complete search history.

(56) References Cited

U.S. PATENT DOCUMENTS

| | | | |
|---|---|---|---|
| 2003/0036843 A1* | 2/2003 | Okude ................ | G06F 9/4843 701/36 |
| 2010/0162042 A1* | 6/2010 | Inoue ................. | G06F 11/2025 714/11 |

(Continued)

FOREIGN PATENT DOCUMENTS

| | | |
|---|---|---|
| JP | 2003036174 A | 2/2003 |
| JP | 2007133603 A | 5/2007 |

(Continued)

*Primary Examiner* — Tan Q Nguyen
(74) *Attorney, Agent, or Firm* — Harness, Dickey & Pierce, P.L.C.

(57) ABSTRACT

A vehicle device includes a control unit and a monitoring unit monitoring an abnormality occurred in the control unit and solving the abnormality. The control unit includes a plurality of operating systems that respectively control a plurality of human machine interfaces. The monitoring unit monitors whether the abnormality is occurred in functions of the control unit. In response to a detection of the abnormality, the monitoring unit solves the abnormality of the function in which the abnormality is detected while continuing operation of the function in which the abnormality is not detected.

9 Claims, 5 Drawing Sheets

(56) References Cited

U.S. PATENT DOCUMENTS

| | | | |
|---|---|---|---|
| 2011/0245935 A1* | 10/2011 | Katou | ............... G05B 9/03 700/21 |
| 2012/0317442 A1 | 12/2012 | Nagano et al. | |
| 2017/0262339 A1 | 9/2017 | Hoshina | |
| 2020/0148144 A1 | 5/2020 | Shiomi | |

FOREIGN PATENT DOCUMENTS

| | | | |
|---|---|---|---|
| JP | 2008305317 A | 12/2008 |
| JP | 2009073386 A | 4/2009 |
| JP | 2009116699 A | 5/2009 |
| JP | 2010285001 A | 12/2010 |
| JP | 2011022934 A | 2/2011 |
| JP | 2015-092407 A | 5/2015 |
| JP | 2015141324 A | 8/2015 |
| JP | 2017161760 A | 9/2017 |
| JP | 2018194887 A | 12/2018 |
| JP | 2019018844 A | 2/2019 |
| WO | WO-2011087020 A1 | 7/2011 |

* cited by examiner

VEHICLE DEVICE

CROSS REFERENCE TO RELATED APPLICATIONS

The present application is a continuation application of International Patent Application No. PCT/JP2020/018677 filed on May 8, 2020, which designated the U.S. and claims the benefit of priority from Japanese Patent Application No. 2019-096783 filed on May 23, 2019. The entire disclosures of all of the above applications are incorporated herein by reference.

TECHNICAL FIELD

The present disclosure relates to a vehicle device.

BACKGROUND

Conventionally, a vehicle device in which a display is disposed near the meter panel to display information about the vehicle is known.

SUMMARY

The present disclosure provides a vehicle device. The vehicle device includes a control unit and a monitoring unit monitoring an abnormality occurred in the control unit and solving the abnormality. The control unit includes a plurality of operating systems that respectively control a plurality of human machine interfaces. The monitoring unit monitors whether the abnormality is occurred in functions of the control unit. In response to a detection of the abnormality, the monitoring unit solves the abnormality of the function in which the abnormality is detected while continuing operation of the function in which the abnormality is not detected.

BRIEF DESCRIPTION OF DRAWINGS

Objects, features and advantages of the present disclosure will become apparent from the following detailed description made with reference to the accompanying drawings. In the drawings.

DETAILED DESCRIPTION

Before describing embodiments of the present disclosure, a known vehicle device will be described. In recent years, there is a vehicle device in which a display is disposed near the meter panel to display information about the vehicle such as speed, or the entire meter panel is composed of a display to graphically display a speedometer or the like. There is also a vehicle device provided with a display for displaying so-called multimedia information such as a navigation screen. Further, there is disclosed a vehicle device that integrates multiple functions such as displaying vehicle related information and displaying the multimedia information. Hereinafter, a vehicle device integrating multiple functions will be referred to as an integrated vehicle device for convenience.

In the above integrated vehicle device, multiple human-machine interfaces are configured to be controlled by a single control unit. Hereinafter, the human-machine interface will be referred to as HMI. By seamlessly linking these multiple HMIs, it is possible to display a navigation screen on the meter panel or display information about the vehicle on a display that displays multimedia information.

Different from the conventional configuration in which the HMIs are controlled by individual devices, in the above-described integrated vehicle device, when an abnormality occurs in a part of the integrated vehicle device, the HMI which has no abnormality may be also out of control, and an operation of the whole vehicle device will be affected.

According to an aspect of the present disclosure, a vehicle device includes a control unit and a monitoring unit that monitors an abnormality occurred in the control unit and solves the abnormality. The control unit includes a plurality of operating systems that respectively control a plurality of human machine interfaces. With this configuration, when an abnormality occurs, the risk that the abnormality affects the entire vehicle device can be reduced.

The monitoring unit monitors whether the abnormality is occurred in functions of the control unit. When detecting the abnormality, the monitoring unit continues operation of the function in which the abnormality is not detected and solves the abnormality of the function in which the abnormality is detected. With this configuration, it is possible to continue the function in which the abnormality is not occurred, and the abnormality can be solved in the function where the abnormality is detected. Therefore, it is possible to solve the abnormality while suppressing the adverse effect of the abnormality on the entire vehicle device.

Figure 1:
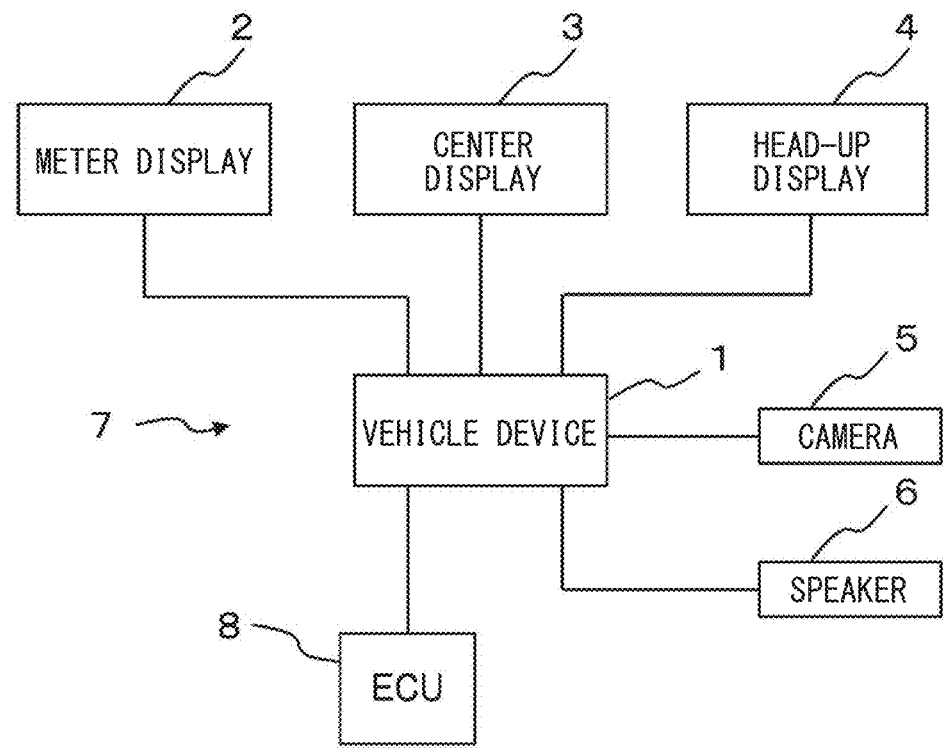
FIG. 1 is a diagram schematically showing a connection mode of a vehicle device according to an embodiment of the present disclosure.

Hereinafter, an embodiment of the present disclosure will be described. As shown in FIG. 1, a vehicle device 1 is connected to multiple display devices such as a meter display 2, a center display 3, a head-up display 4 or the like. The vehicle device 1 is also connected to other devices such as a camera 5 and a speaker 6. The vehicle device 1 is included, together with other devices, in a cockpit system 7 that realizes so-called vehicle infotainment. Further, the vehicle device 1 is also connected to an ECU 8 provided in the vehicle, and is configured to receive information such as the vehicle speed. The configuration shown in FIG. 1 is an example and the present disclosure is not limited to the configuration shown in FIG. 1.

Figure 2:
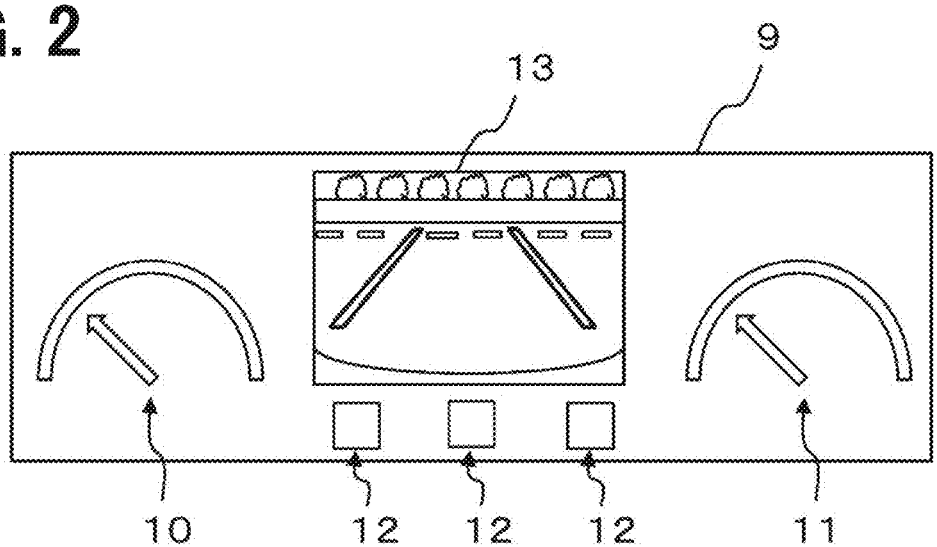
FIG. 2 is a diagram schematically showing a configuration of a meter display.

The meter display 2 is provided by, for example, a liquid crystal display or an organic EL display, and is disposed on a meter panel 9 located on a front side of the driver as shown in FIG. 2. In the present embodiment, the entire meter panel 9 is provided by a single display panel, and forms a meter display 2. On the meter display 2, for example, a speedometer 10, a rotation speed meter 11, various warning lights 12, a rear image 13 indicating a rear area of the vehicle, and the like are displayed in full graphic.

The meter display 2 mainly displays, for example, vehicle speed, warning, information stipulated by law, information indicating a state of the vehicle such as the remaining amount of fuel and whether or not the seatbelt is fastened, and information indicating traveling state or safety of the vehicle. Hereinafter, these information will be referred to as vehicle information for convenience. Further, the meter display 2 also displays an activation message indicating activation of the vehicle device 1 and a deactivation message indicating deactivation of the vehicle device 1. Based on these information, a human-machine interface of the meter display 2 is configured. Hereinafter, the human-machine interface will be referred to as HMI.

Figure 3:
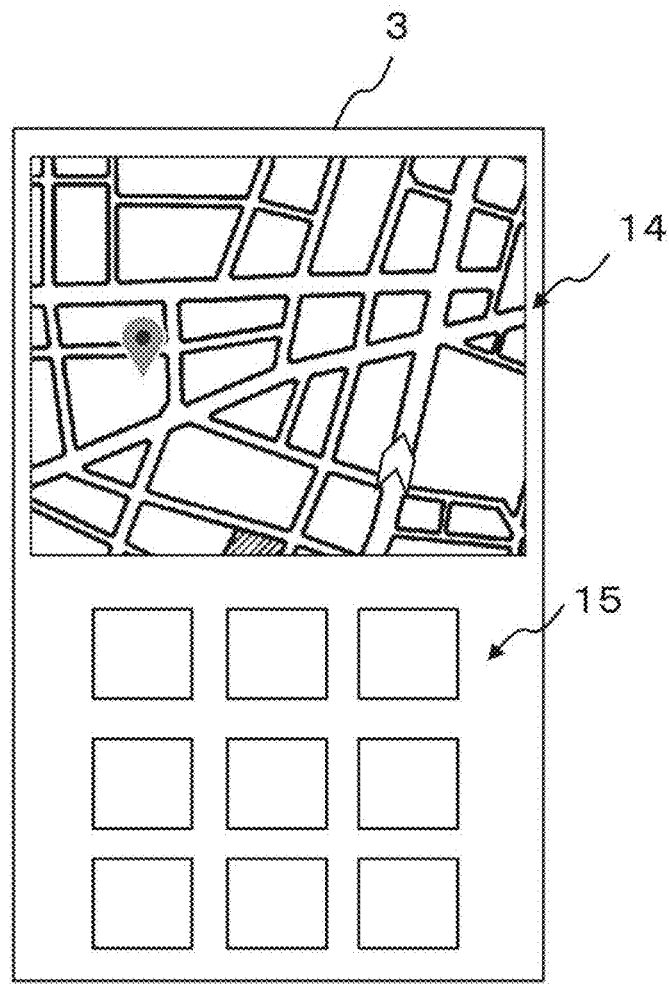
FIG. 3 is a diagram schematically showing a configuration of a center display.

The center display 3 is provided by, for example, a liquid crystal display or an organic EL display, and is arranged to be adjacent to a so-called center console. As shown in FIG. 3, the center display 3 displays, for example, a navigation screen image 14 or a menu screen image 15.

The center display 3 can also display a television broadcast, information about a music being played back or the like. That is, the center display 3 mainly displays so-called multimedia information such as the navigation screen 14 and the menu screen 15. These displays constitute an HMI of the center display 3.

The head-up display 4 projects, for example, a generated display image toward a projection surface such as a front window or a combiner via an optical path such as a concave mirror or a lens, and forms a virtual image in the space in front of the driver. The head-up display 4 is assumed to be provided adjacent to the front of the driver on the dashboard. That is, the head-up display 4 is provided at a position where the displayed image is easy to be seen by the driver.

Figure 4:
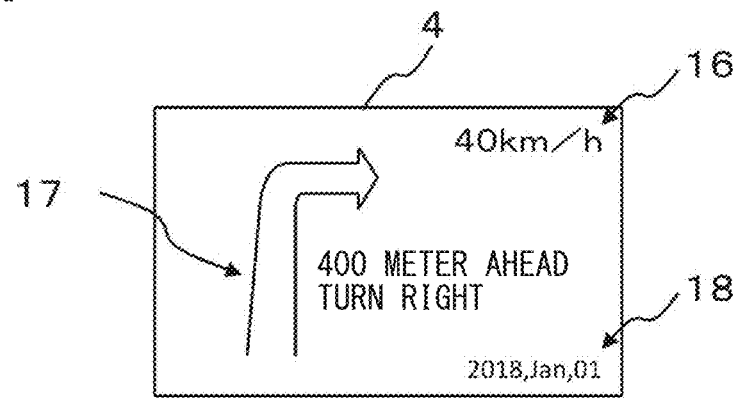
FIG. 4 is a diagram schematically showing a configuration of a head-up display.

In other words, the head-up display 4 is provided at a position where it can be seen by the driver during normal driving. As shown in FIG. 4, the head-up display 4 displays, for example, a vehicle speed display 16, a direction image 17 showing a distance to a turning point and a turning direction, a current time 18, and the like. These displays constitute an HMI of the head-up display 4.

The meter display 2, the center display 3, and the head-up display 4 can display information by being seamlessly linked with one another. For example, the navigation screen 14 can be displayed on the meter display 2, and the vehicle speed can be displayed on the center display 3.

The camera 5 includes a CCD sensor and a CMOS sensor, and captures outside images of the vehicle as moving images or still images. In the present embodiment, the camera 5 is arranged at a position where images of the rear area of the vehicle can be captured. The image captured by the camera 5 is displayed on, for example, the meter display 2 or the center display 3. The speaker 6 outputs guidance speech during navigation, outputs audio signal of music being played back, and the like.

As described above, in the vehicle device 1 of the present embodiment, multiple functional units including a functional unit that displays information indicating the state of the vehicle and a functional unit that displays multimedia information are integrated to provide various information. The vehicle device 1 an integrated type device that can present information visually or audibly to the driver.

Figure 5:
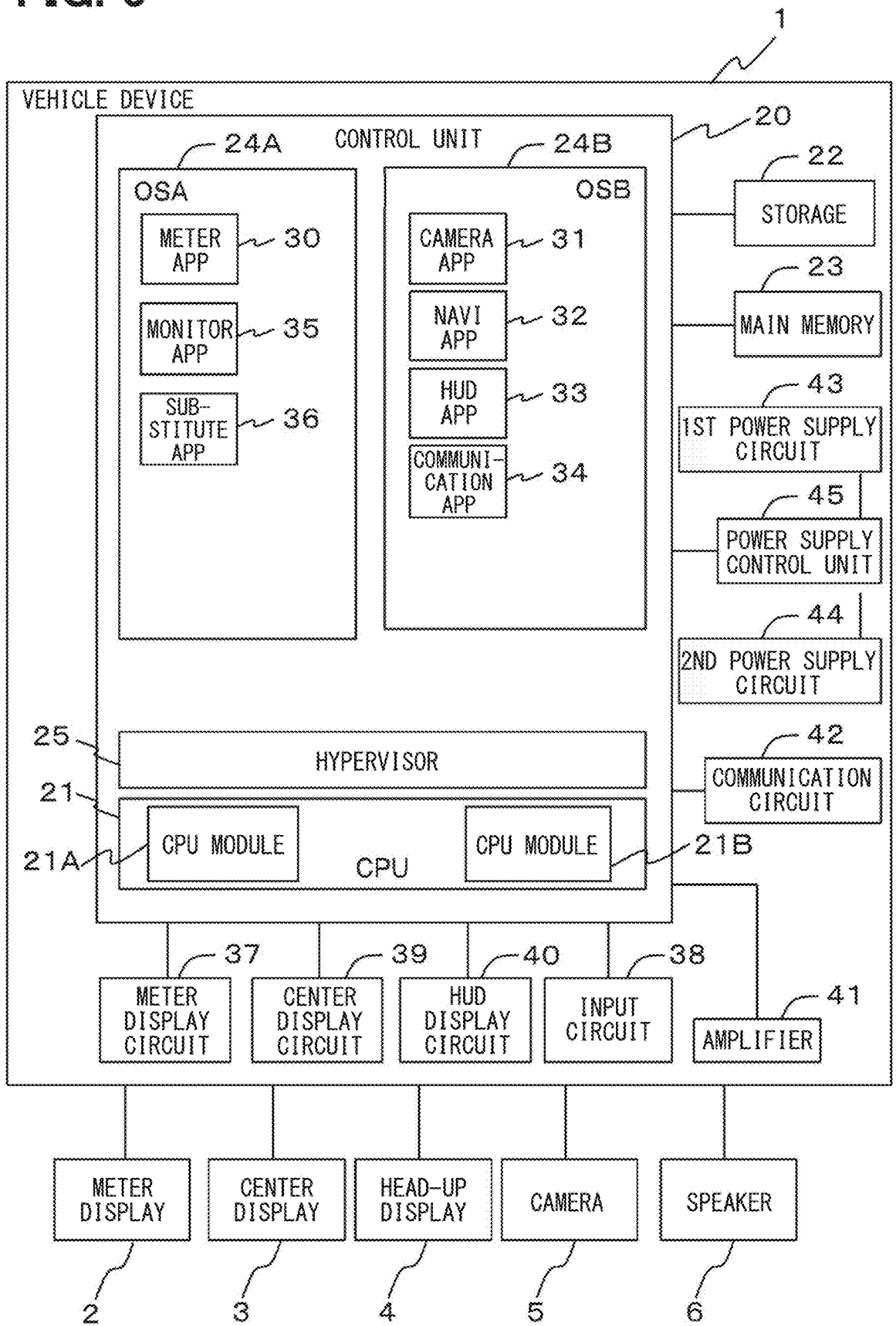
FIG. 5 is a diagram schematically showing a configuration of the vehicle device.

As shown in FIG. 5, the vehicle device 1 is configured to be controlled by a single control unit 20. The control unit 20 includes a microcomputer having a CPU 21 and the like. The control unit 20 controls the vehicle device 1 by executing a computer program stored in a storage device 22, and the storage device 22 may include a non-volatile memory or the like. At this time, each program is read and executed on the main memory 23.

A virtual environment in which multiple operating systems 24 can operate is provided by the control unit 20. Hereinafter, the operating system 24 will be referred to as an OS 24. In the present embodiment, OS 24A and OS 24B operate in the control unit 20. That is, in the vehicle device 1, multiple systems operate on one hardware, and each OS executes corresponding process.

The vehicle device 1 diversifies the risk of system failure by operating multiple systems. The OS 24A and the OS 24B are communicably connected with one another. The various devices included in the vehicle device 1 are shared by the OS 24A and the OS 24B.

More specifically, the control unit 20 divides, for example, each of four cores into a CPU module 21A and a CPU module 21B, and the OS 24A operates on the CPU module 21A, and the OS 24B operates on the CPU module 21B. At this time, the OS 24B operates on a hypervisor 25 provided as a function of the OS 24A. The hypervisor 25 may be provided individually, and the OS 24A and OS 24B may be operated on the hypervisor 25.

The OS 24A is a so-called real-time OS, and includes a functional block that mainly executes a process that requires real-time performance such as a process related to vehicle running or safety, as compared with the OS 24B. In general, such a real-time OS is less likely to cause a problem in the OS 24A itself, and can be considered to have relatively higher stability than a general-purpose OS because it can predict or limit the execution time of an application program. The OS 24A corresponds to a first operating system.

The OS 24B is a so-called general-purpose OS. Although its real-time performance and stability are relatively low as compared with the OS 24A, it has an advantage that general-purpose processing such as a so-called multimedia function can be easily executed. The OS 24B corresponds to a second operating system.

Each OS 24 provides various functional units in software manner by executing various application programs. Hereinafter, an application program will also be referred to as an application, and abbreviated as APP. Examples of the functional unit included in the control unit 20 include a meter application 30, a camera application 31, a navigation application 32, a HUD application 33, a communication application 34, a monitoring application 35, and a substitute application 36. These functional units are implemented by programs executed by the control unit 20. Further, the number and type of functional units shown in FIG. 5 or the OS 24 on which the functional units are implemented are shown as exemplary configurations, and the present disclosure is not limited to the configuration shown in FIG. 5.

The meter application 30 mainly displays the vehicle information acquired from the ECU 8 or the like on the meter display 2. The meter application 30 is provided as a functional unit that controls the HMI for the meter display 2. The meter application 30 displays information necessary for traveling of the vehicle like the speedometer 10. The information display controlled by the meter application 30 needs to be updated at a relatively short cycle of, for example, about 1/60 second. Therefore, the meter application 30 is included in the OS 24A. The HMI controlled by the meter application 30 is transmitted to the meter display 2 as drawing data in, for example, LVDS format via, for example, a meter display circuit 37.

The camera application 31 executes a process of displaying an image input from the camera 5 to an input circuit 38 by, for example, an NTSC signal on a display. The camera application 31 also executes a process of displaying an obstacle included in the captured image and a distance to the obstacle. At this time, the camera application 31 performs general-purpose image processing. Therefore, the camera application 31 is included in the OS 24B. The image controlled to be displayed by the camera application 31 is transmitted to the meter display 2 via the meter display circuit 37, and is displayed on the meter display 2. The image controlled to be displayed by the camera application 31 may be transmitted to the center display 3 as drawing data in the LVDS format, for example, via a center display circuit 39, and may be displayed on the center display 3.

The navigation application 32 mainly controls a display on the center display 3. The navigation application 32 is provided as a functional unit for controlling the HMI of the center display 3. The navigation application 32 executes multimedia process such as generation and display of the navigation screen 14, and executes a process for outputting guidance speech. Therefore, the navigation application 32 is provided in the OS 24B. For example, the image controlled to be displayed by the navigation application 32 may be transmitted to the center display 3 as drawing data in, for example, LVDS format via the center display circuit 39. Further, the guidance speech is output by transmitting a signal to the speaker 6 via an amplifier 41.

The HUD application 33 mainly controls a display on the head-up display 4. The HUD application 33 is provided as a functional unit for controlling the HMI of the head-up display 4. The HUD application 33 plays an auxiliary role when the vehicle is traveling, and also executes multimedia process such as display of a direction image 17. Therefore, the HUD application 33 is provided in the OS 24B. For example, the image controlled to be displayed by the HUD application 33 may be transmitted to the head-up display 4 as drawing data in, for example, LVDS format via a HUD display circuit 40.

The communication application 34 is provided as a functional unit that communicates with an external device other than the vehicle device 1 via a communication circuit 42. Although one communication circuit 42 is shown in FIG. 5, one or more communication circuits 42 corresponding to multiple communication methods can be used, and multiple communication circuits 42 may be provided. The vehicle device 1 may be connected to various devices different from its own via the communication circuits.

The communication method supported by the communication circuit 42 may include known methods, such as USB, Bluetooth (registered trademark), Wi-Fi and the like. The external device may include a mobile terminal or a tablet owned by the driver, a USB memory, a server on the Internet, or the like.

The monitoring application 35 monitors an occurrence of abnormality in the control unit 20 and fixes the detected abnormality. More specifically, the monitoring application 35 detects an abnormality that occurs in the multiple OSs 24, and solves the abnormality of the OS 24 in which the abnormality is detected while continuing the operation of the OS 24 in which the abnormality is not detected. In the present embodiment, the monitoring application 35 is provided in the OS 24A having a relatively high stability, and the monitoring application 35 monitors the OS 24B having a relatively low stability. When detecting an occurrence of abnormality, the monitoring application 35 fixes the abnormality occurred in the OS 24B by resetting the OS 24B while continuing the operation of the OS 24A. This monitoring application 35 corresponds to a monitoring unit.

The substitute application 36 can substitute at least a part of the control process executed by the OS 24. When the monitoring application 35 solves the abnormality, at least a part of the control process executed by the target OS 24B in which the abnormality is detected is executed by the substitute application 36. For example, instead of the OS 24B, the substitute application 36 executes at least a part of the control of the display on the display by the camera application 31, the navigation application 32, or the HUD application 33. The substitute application 36 corresponds to a substitute unit.

The vehicle device 1 having above-described configuration is supplied with power from a first power supply circuit 43 and a second power supply circuit 44, both of which are connected to a battery mounted on the vehicle. A power supply control unit 45 controls a power supply start or power supply stop from each of the first power supply circuit 43 and second power supply circuit 44, and the power supply control unit 45 is provided separately from the control unit 20.

The first power supply circuit 43 has a low voltage countermeasure circuit configuration that maintains power supply even when a power supply voltage from the battery temporarily drops due to cranking, for example. In the present embodiment, in consideration of the battery voltage drop during cranking, power can be supplied even if the battery voltage drops to, for example, about 4 Volts. The first power supply circuit 43 supplies power to a device used by a functional unit that needs to maintain operation state even when a voltage drop occurs. For example, the first power supply circuit 43 supplies power to the control unit 20, the storage unit 22, the main memory 23, the meter display circuit 37, or the like. Hereinafter, these devices will be referred to as control system devices for convenience.

A minimum operation voltage of the second power supply circuit 44 is lower than the rated voltage of the battery. The second power supply circuit 44 does not include the low voltage countermeasure circuit configuration that can deal with a low voltage as the first power supply circuit 43. Therefore, when the voltage drops, the power supply from the second power supply circuit 44 may become unstable. The second power supply circuit 44 supplies power to a device used by a functional unit that does not necessarily need to maintain operation state when a voltage drop occurs. For example, the second power supply circuit 43 supplies power to the center display circuit 39, the amplifier 41, the communication circuit 42, or the like. Hereinafter, these devices will be referred to as multimedia (MM) devices for convenience.

The following will describe the operation of the vehicle device 1 having the above configuration.

As described above, in the integrated vehicle device 1, a single control unit 20 controls multiple HMIs. Therefore, it is possible to seamlessly link multiple HMIs. However, when an abnormality occurs in a part of the HMI, the abnormality may affect the entire vehicle device 1. Therefore, in the vehicle device 1, the abnormality is solved while suppressing the influence of the abnormality on the entire device as follows.

Figure 6:
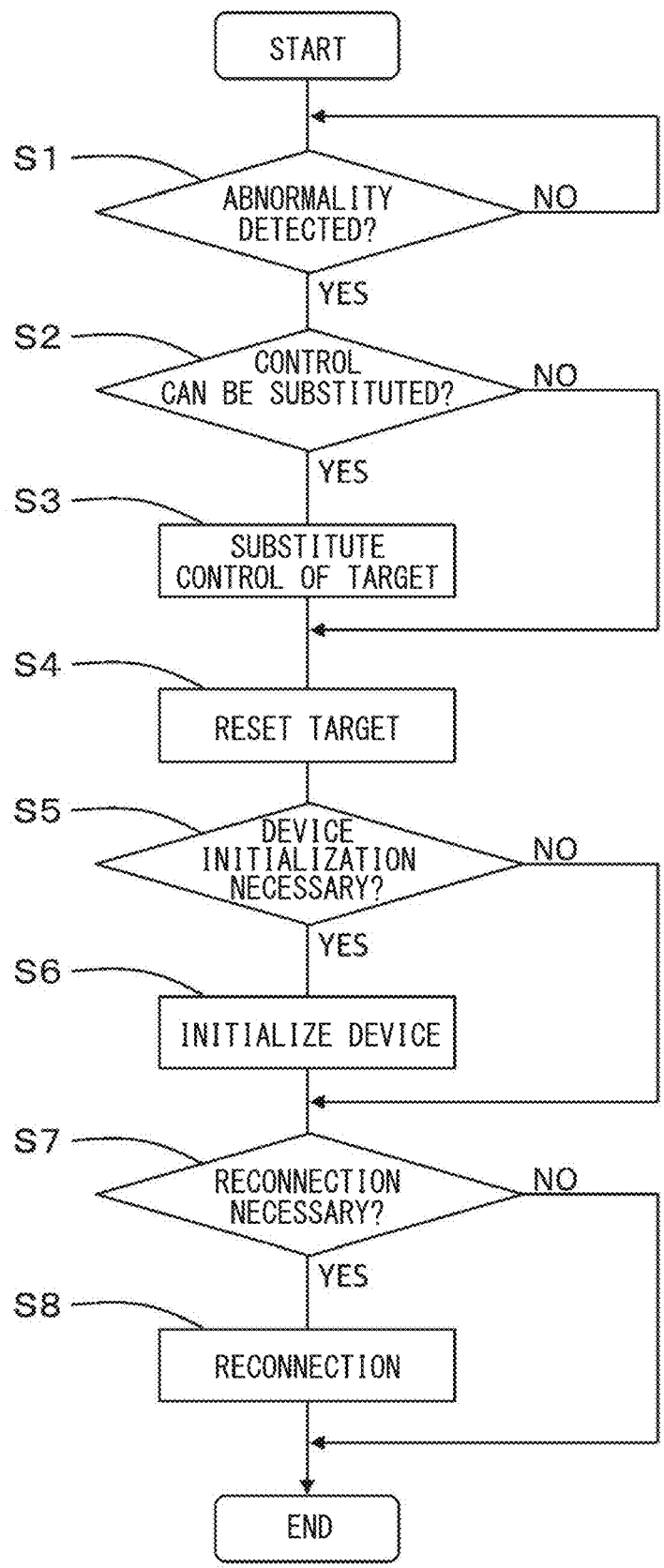
FIG. 6 is a flowchart showing a process executed to fix an abnormality.

The monitoring application 35 of the vehicle device 1 executes a process shown in FIG. 6 to monitor the OS 24B. Specifically, the monitoring application 35 determines in step S1 whether an abnormality in the OS 24B is detected. When the monitoring application 35 determines that no abnormality is detected, the result in S1 is NO, and the monitoring application 35 repeats S1.

When the monitoring application 35 determines that an abnormality is detected, the result in S1 is YES. Then, in S2, the monitoring application determines whether the control process executed by the target in which the abnormality is detected can be taken over by another application. Specifically, the monitoring application determines whether the control process executed by the OS 24B in which the abnormality is detected can be taken over by another application. Herein, taking over the control process includes taking over the entire control process that has been executed up to now by the target as it is, and also includes taking over partial control that has been executed by the target.

For example, suppose that the camera application 31 displays, on the meter display 2, the rear image 13, the obstacle, and the distance to the obstacle. At this time, when an abnormality is detected in the camera application 31, the OS 24B is reset in order to solve the abnormality. In that case, the substitute application 36 may take over the control of displaying the rear image 13 on the meter display 2, but not take over the control of displaying the obstacle and the distance to the obstacle on the meter display 2. Alternatively, the control for displaying the obstacle and the distance to the obstacle can also be taken over by the substitute application 36. This configuration can avoid a situation in which the rear image 13 is not displayed at all due to an abnormality in the camera application.

For example, when an abnormality occurs in the navigation application 32 or the HUD application 33, the substitute application 36 may gray out the display of the center display 3 or display a slightly blurred image on the center display 3 in order to notify the occurrence of abnormality. In this configuration, the entire control for displaying the navigation screen 14 and the menu screen 15 is not taken over as it is. Instead, the function of displaying HMI is taken over. Thus, it is possible to avoid a situation that the vehicle device 1 is thought to be broken down by the user caused by the deactivation of entire display on the center display 3.

When the monitoring application 35 determines that the substitute is possible, the result is YES in S2. Then, in S3, the substitute application 36 takes over the control which was executed by the target. If the monitoring application 35 determines that the substitute is not possible, it becomes NO in S2, and S3 is omitted. Then, the process proceeds to S4.

The monitoring application 35 solves the abnormality occurred in the target in S4. In the present embodiment, the monitoring application 35 solves the abnormality occurred in the target by resetting the target OS 24B. While the target OS 24B is being reset, the display will be performed by the substitute application 36. In a case where the substitute application 36 cannot be used, a message such as "resetting" will be displayed by the OS 24A during the reset of the target OS 24B.

The devices included in the vehicle device 1 are shared by the OS 24A and the OS 24B as described above. Depending on the abnormality detected in the OS 24B, it may be necessary to restart the corresponding device. For example, when the abnormality occurred in the OS 24B is caused by a certain device being stopped, the OS 24A may also be affected by the same device that stopped the operation. When the abnormality is a programmatic problem, it is assumed that the device can be used continuously without reset.

The monitoring application 35 determines in S5 whether the device needs to be initialized. When the monitoring application 35 determines that the device needs to be initialized, the result is YES in S5. Then, the monitoring application 35 initializes the target device in S6. When the monitoring application 35 determines that it is not necessary to initialize the device, the result is NO in S5, and S6 is omitted. Then, the process proceeds to S7.

The monitoring application 35 determines in S7 whether reconnection is necessary. Specifically, the monitoring application 35 determines whether reconnection between OS 24A and OS 24B is necessary. When the OS 24B is reset, it is generally considered that reconnection is necessary.

Therefore, the monitoring application 35 determines YES in S7, and the reconnection process is executed in S8. As a result, the OS 24A and the OS 24B are reconnected so as to be communicable with one another after the reset is completed. An example in which reconnection is not necessary will be described later.

Then, the monitoring application 35 ends the process. Although it is said that the process is terminated here for the sake of convenience, in real practice, the monitoring application 35 returns to S1 and repeats the monitoring of abnormality.

As described above, when an abnormality is detected in the vehicle device 1, the abnormality is solved by resetting the target OS 24B, and the OS 24A continues the operation without being affected by the abnormality and reset of target OS 24B. Thus, the abnormality can be solved while suppressing the adverse effect of the abnormality to entire vehicle device 1.

According to the embodiment described above, following advantages can be achieved.

The vehicle device 1 includes the control unit 20 and the monitoring application 35 as a monitoring unit for monitoring and eliminating the abnormality. The vehicle device 1 operates multiple OSs 24 that share and control multiple HMIs in the control unit 20. With this configuration, when an abnormality occurs, the risk that the abnormality affects the entire vehicle device 1 can be reduced.

The monitoring application 35 monitors abnormality occurrence in the multiple OSs 24 which corresponds to functional blocks of the control unit, and solves the abnormality of the OS 24 in which the abnormality is detected while continuing the operation of the OS 24 in which the abnormality is not detected. As a result, the OS 24 in which the abnormality is not detected can continue operation, and the abnormality can be solved while suppressing the adverse effect of the abnormality to the entire vehicle device.

The vehicle device 1 includes the substitute application 36 as the substitute unit, and the substitute application is capable of substituting at least a part of the control executed by the target OS 24 in which the abnormality is detected. While the abnormality is being solved, the monitoring application 35 controls the substitute application 36 to execute at least a part of the control which was executed by the target OS 24.

As a result, it is possible to avoid a situation in which the control that has been executed up to now suddenly stops. For example, it is possible to avoid that the entire images displayed on the display device suddenly disappear. Therefore, the risk that the abnormality affects the entire vehicle device 1 can be reduced, and the anxiety of the driver caused by the disappearing of display can be reduced.

In the vehicle device 1, the multiple OSs 24 mainly process information about the vehicle. The multiple OSs 24 include the first OS 24A that has relatively high stability and mainly process multimedia information and the second OS 24B that is relatively less stable than the first OS 24A.

This configuration makes it possible to efficiently operate each function in the vehicle device 1 that integrates multiple functions. By disposing the functional unit that requires stable operation in the OS 24A and disposing the functional unit that executes general-purpose process in the OS 24B, a single control unit 20 can generate multiple types of HMI with high efficiency even though the type of information to be displayed and the process to display the information are different in each HMI. Further, by distributing the process, the range affected by the abnormality can be reduced, and the adverse effect on the entire vehicle device 1 can be suppressed.

The monitoring application 35 is provided in the first OS 24A, and detects an abnormality that occurs in the second OS 24B. Since the OS 24A is relatively and generally highly stable as described above, the monitoring application 35 can be operated stably. The OS 24B can perform various general-purpose processes. However, the OS 24B has relatively low stability and is connected to a wide variety of external devices. That is, in the OS 24B, there is a possibility that an abnormality may be caused by an external device in addition to the OS 24B itself.

By providing the monitoring application 35 in the OS 24A to serve as a master and monitoring the OS 24B as a slave, it is possible to monitor and eliminate abnormality in a manner suitable for the vehicle device 1. The monitoring application 35 is provided in the OS 24A having the highest stability relative to other OSs 24, and the monitoring application 35 can be stably operated by this configuration for detecting an abnormality occurred in another OS 24B. This configuration makes it possible to monitor abnormality and eliminate the abnormality in a manner suitable for the vehicle device 1.

The vehicle device 1 controls the HMI including a display control on the display device. The display device presents information to the driver and is considered to be installed within the driver's field of view. Then, when an abnormality occurs in the display on the display device, the abnormality can be visually recognized by the driver. Therefore, the display on the display device is considered to be an important target for monitoring and eliminating abnormality. By targeting the HMI including the display on the display device as a target for monitoring and eliminating the abnormality, it is possible to reduce a risk of causing the driver to feel anxious or distrustful.

The vehicle device 1 controls the HMI including the display of image captured by the camera 5 on the display device. Since the rear area of the vehicle is a blind spot for the driver, it is difficult for the driver to grasp an existence of obstacles or people. Therefore, it is considered that the driver can be assisted by displaying, on the display device, the images indicating the rear area of the vehicle captured by the camera 5. Therefore, by setting the HMI executing the display of the image captured by the camera 5 on the display device as the target of abnormality monitoring and eliminating the abnormality, it is possible to improve the convenience of the driver and suppress an occurrence of accident.

Figure 7:
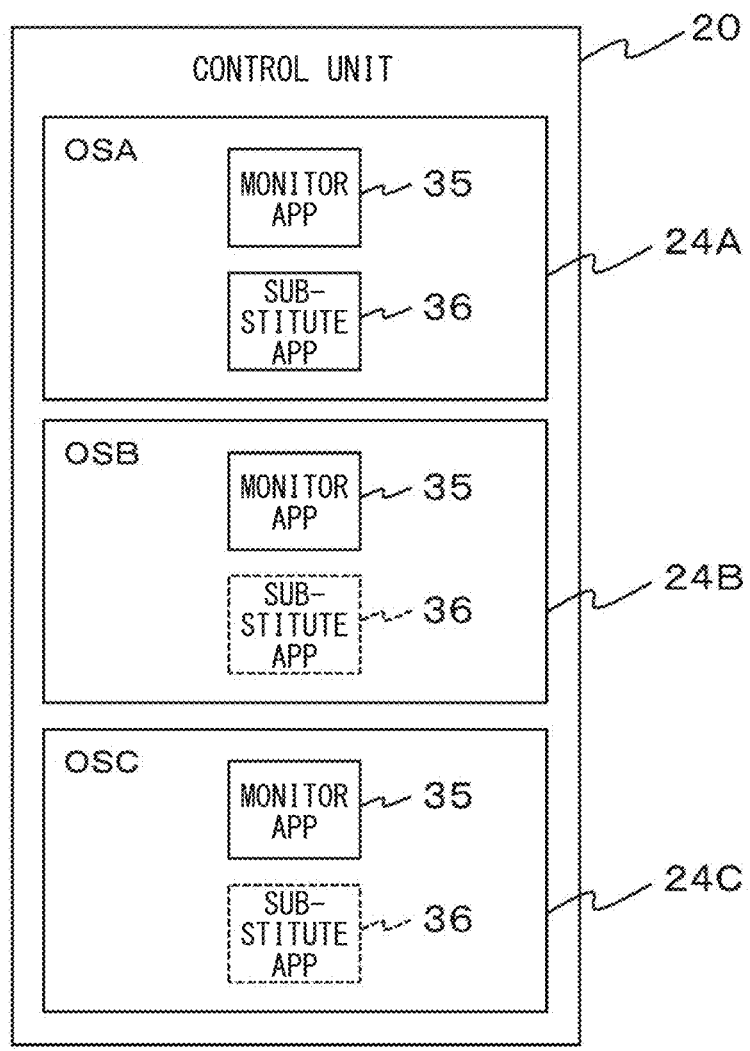
FIG. 7 is a diagram showing another configuration of a vehicle device according to the present disclosure.

In the above embodiment, an example in which the OS 24A operates as a master and the OS 24B operates as a slave is shown. Alternatively, as shown in FIG. 7, each OS 24 may be provided with a monitoring application 35, and multiple OSs 24 may be mutually monitored by one another. In this configuration, the substitute application 36 can be provided, for example, in the OS 24A having the relatively high stability, and can be configured to uniquely substitute the control of another OS 24. As shown schematically by the broken line in FIG. 7, a substitute application 36 may be provided in each OS 24.

With such a configuration, it is possible to solve the abnormality of the OS 24 in which the abnormality is detected while the operation of the OS 24 in which the abnormality is not detected continues, and the abnormality can be solved while suppressing the influence on the entire vehicle device.

The vehicle device 1 can be operated with three or more OSs 24 such as OS 24A, OS 24B, and OS 24C. In this case, each OS 24 may be operated on the hypervisor 25 as in the above embodiment. Further, for example, OS 24C may be operated as a virtual environment on the OS 24B.

With such a configuration, since the process is shared by multiple OSs 24, the risk of failure can be diversified, and the range affected by the failure can be limited. Thus, the risk of adverse effect to the entire vehicle device 1 can be suppressed.

In the above embodiment, the functions of the OS 24 are monitored by the monitoring application 35. The monitoring application 35 monitors each application which functions as a functional block of the control unit 20. When an abnormality is detected in one application, the application is reset by the monitoring application 35. By this configuration, the monitoring application solves the abnormality occurred in the functional blocks of the control unit. With such a configuration, it is possible to solve the abnormality while continuing the operation of the functional unit that is operating normally without abnormality occurrence. Therefore, it is possible to solve the abnormality while suppressing the adverse effect of the abnormality on the entire vehicle device 1.

In the above embodiment, the speedometer 10, the rotation speed meter 11, or the warning light 12 are displayed in full graphic. Alternatively, the meter display 2 may be disposed at a central portion of the meter panel 9, and the speedometer 10, the rotation speed meter 11, and the warning light 12 may be provided in an analog manner without full graphic display.

In the above embodiment, the camera application 31 is provided in the OS 24B. Alternatively, in order to display the image from the camera 5 in a quick and stable state, the camera application 31 may be provided in the OS 24A.

Although the present disclosure has been described in accordance with the example embodiments, it is understood that the disclosure is not limited to such example embodiments or structures. The present disclosure includes various modifications and deformations within an equivalent range. In addition, various combinations and forms, and further, other combinations and forms including only one element, or more or less than these elements are also within the sprit and the scope of the present disclosure.

In the above embodiment, the control unit may be provided separately as one or more than one controller or may be provided integrally as one or more than one controller. Such a controller and method thereof described in the present disclosure may be implemented by one or more than one special-purpose computer. Alternatively, the control circuit described in the present disclosure and the method thereof may be realized by a dedicated computer configured as a processor with one or more dedicated hardware logic circuits. Alternatively, the control unit and the technique according to the present disclosure may be achieved using one or more dedicated computers constituted by a combination of the processor and the memory programmed to execute one or more functions and the processor with one or more hardware logic circuits. Further, the computer program may be stored in a computer-readable non-transitory tangible storage medium as instructions executed by a computer.

What is claimed is:

1. A vehicle device comprising:
   a control unit;
   a monitoring unit monitoring an abnormality occurred in the control unit and solving the abnormality; and
   a substitute unit that substitutes at least a part of control executed by functions of the control unit, wherein
the control unit includes a plurality of operating systems that respectively control a plurality of human machine interfaces,
the control unit provides the functions in software manner by executing programs with the plurality of operating systems,
among the functions installed in the plurality of operating systems, the monitoring unit monitors whether the abnormality is occurred in a display function related to the plurality of human machine interfaces,
in response to a detection of the abnormality of the display function, the monitoring unit solves the abnormality of the display function,
during the abnormality being solved, the monitoring unit controls the substitute unit to execute at least a part of the display function in which the abnormality is detected or notify that the abnormality is being solved by displaying information on one of the plurality of human machine interfaces.

2. The vehicle device according to claim 1, wherein
the plurality of operating systems include a first operating system and a second operating system,
the first operating system mainly processes information related to a vehicle and has a higher stability relative to the second operating system,
the second operating system mainly processes multimedia information and has a lower stability relative to the first operating system, and
the control unit assigns the functions of the control unit to the first operating system and the second operating system.

3. The vehicle device according to claim 2, wherein
the monitoring unit is included in the first operating system and detects the abnormality occurred in the second operating system.

4. The vehicle device according to claim 1, wherein
the monitoring unit is included in one of the plurality of operating systems which has a highest stability relative to remaining operating systems, and
the monitoring unit detects the abnormality occurred in another one of the plurality of operating systems.

5. The vehicle device according to claim 1, wherein
the monitoring unit is included in each of the plurality of operating systems, and
each monitoring unit detects the abnormality occurred in another operating system.

6. The vehicle device according to claim 1, wherein
the control unit controls the human machine interface that displays information on a display device.

7. The vehicle device according to claim 1, wherein
the control unit controls the human machine interface that displays images captured by a camera on a display device.

8. The vehicle device according to claim 1, wherein
the control unit includes three or more operating systems as the plurality of operating systems.

9. A vehicle device comprising:
a microcomputer including a first operating system and a second operating system, each of the first operating system and the second operating system controls a corresponding human machine interface; and
a storage storing application programs to be executed by the microcomputer,
wherein
the first operating system mainly processes information related to a vehicle and has a higher stability relative to the second operating system,
the second operating system mainly processes multimedia information and has a lower stability relative to the first operating system,
the microcomputer provides, in software manner by executing the application programs stored in the storage, a first function and a second function with the first operating system and the second operating system, respectively,
the microcomputer, by executing a substitute application in software manner, substitutes at least a part of control executed by the first function and the second function of the microcomputer,
the first operating system includes a monitoring application that monitors an abnormality occurred in the second function executed by the second operating system, the second function is a display function related to the human machine interface,
in response to a detection of the abnormality in the display function, the microcomputer solves the abnormality of the display function while continuing operation of the first function in which the abnormality is not detected, and
during the abnormality of the display function being solved, the microcomputer, by executing the substitute application, executes at least a part of the display function in which the abnormality is detected or notify that the abnormality of the display function is being solved by displaying information on the human machine interface.

\* \* \* \* \*